Patented June 9, 1931

1,809,212

UNITED STATES PATENT OFFICE

WALTER MIEG, OF OPLADEN, AND FRITZ BAUMANN, OF LEVERKUSEN-ON-THE-RHINE, GERMANY, ASSIGNORS TO GENERAL ANILINE WORKS, INC., OF NEW YORK, N. Y., A CORPORATION OF DELAWARE

NEW AMINO-1.1'-ANTHRIMIDCARBAZOLS

No Drawing.    Application filed March 15, 1928.    Serial No. 262,040.

The present invention relates to new amino-1.1'-anthrimidcarbazols.

We have found that when reacting with strong sulfuric acid upon α-acylamino-1.1'-anthrimidcarbazols of the probable general formula:

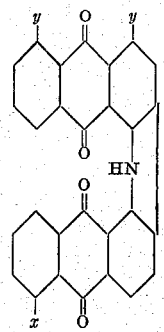

wherein at least one $y$ stands for an acylamino residue, $x$ stands for a hydrogen atom, which may be replaced by an acylamino group, the corresponding α-aminoanthrimidcarbazols heretofore unknown are obtainable, which may be used as vat dyestuffs or as intermediate products for the manufacture of dyestuffs. We prefer to execute the saponification by means of a sulfuric acid of about 60° to 66° Bé. and at temperatures ranging from about 60° to 120° C. mainly depending on the strength of the sulfuric acid and on the kind of the starting material applied. When saponifying by means of a sulfuric acid of about 60° Bé. the amino-anthrimidcarbazols separate during the reaction as sulfates and may be isolated in the usual manner. When working with a stronger sulfuric acid it will be advantageous to dilute the same after the saponification until the corresponding sulfates separate. Obviously the working up of the reaction mixture may be performed by pouring the same into water, filtering and washing the residue with water.

The new amino-1.1'-anthrimidcarbazols form yellowish-brown to dark grey powders, soluble in strong sulfuric acid with brown to olive colorations, dyeing cotton from the hydrosulfite vat brown to corinth shades.

The following examples illustrate our invention without limiting it thereto:

*Example 1.*—6 parts by weight of 4-benzoyl-amino-1.1'-anthrimidcarbazol are heated in 50 parts by volume of sulfuric acid of 96% strength to 95° C. until samples diluted with water no more change in color. Now the reaction mixture is diluted by means of 20 parts by volume of a sulfuric acid of 50% strength whereby the sulfate of the 4-amino-1.1'-anthrimidcarbazol deposits which is filtered and washed first with sulfuric acid of 60° Bé. and then with water. The 4-amino-1.1'-anthrimidcarbazol having the probable formula:

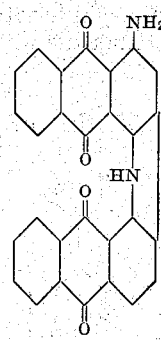

is thus obtained in form of a dark grey powder, which dissolves in sulfuric acid of 96% strength and in hot nitrobenzene with a brown coloration. The alkaline hydrosulfite vat of the product is yellowish brown.

*Example 2.*—10 parts by weight of 5.5'-dibenzoyldiamino-1.1'-anthrimidcarbazol are heated in 150 parts by volume of a sulfuric acid of 60° Bé. for about one hour at 120° C. while stirring. When cooled the sulfate of the 5.5'-diamino-1.1'-anthrimidcarbazol separates, which is further treated as mentioned in Example 1.

The 5.5'-diamino-1.1'-anthrimidcarbazol of the probable formula:

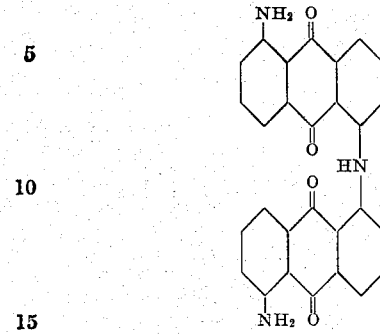

forms a red-brown powder, soluble in strong sulfuric acid with an olive brown coloration which changes to blue at the addition of formaldehyde. It is difficulty soluble in the usual organic solvents and crystallizes from much nitrobenzene in fine red needless. It dyes cotton from an orange-yellow hydrosulfite vat strong reddish-brown shades.

When using instead of a sulfuric acid of 60° Bé. a sulfuric acid of 96% strength saponification takes place already at a temperature of 60° C.

*Example 3.*—1 part by weight of 4.5'-diacetyldiamino - 1.1'-anthrimidcarbazol are heated in 20 parts by weight of a sulfuric acid of 96% strength to 80° C. until samples, poured into water no more change in color. The 4.5'-diaminoanthrimidcarbazol, isolated in the usual manner, forms a violet brown powder, soluble in strong sulfuric acid with a pale reddish brown coloration, difficulty soluble in the usual organic solvents. It dyes cotton from the alkaline hydrosulfite vat corinth shades.

We claim:

1. Compounds of the probable general formula:

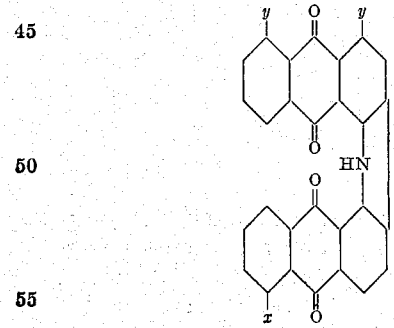

wherein at least one $y$ stands for an amino group, $x$ stands for a hydrogen atom, which may be replaced by an amino group, said products being yellowish brown to dark grey powders soluble in strong sulfuric acid with brown to olive colorations; dyeing cotton from the hydrosulfite vat brown to corinth shades.

2. The compound of the probable formula:

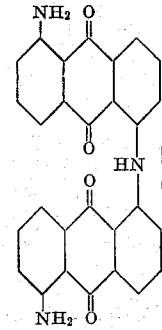

said compound being a red brown powder, soluble in strong sulfuric acid with an olive-brown coloration which changes to blue at the addition of formaldehyde, dyeing cotton from the hydrosulfite vat strong reddish brown shades.

In testimony whereof we have hereunto set our hands.

WALTER MIEG.
FRITZ BAUMANN.